United States Patent [19]

Kohlbauer

[11] Patent Number: 4,821,560

[45] Date of Patent: Apr. 18, 1989

[54] DUAL OUTPUT MAGNETIC SENSOR

[75] Inventor: Ronald G. Kohlbauer, Freeport, Ill.

[73] Assignee: Honeywell Inc., Minneapolis, Minn.

[21] Appl. No.: 200,844

[22] Filed: Jun. 1, 1988

[51] Int. Cl.$^4$ ............................................. G01M 15/00
[52] U.S. Cl. ............................. 73/117.3; 310/DIG. 2
[58] Field of Search ............... 73/116, DIG. 3, 117.3;
310/DIG. 2; 335/215; 330/6; 123/414, 416, 428, 478

[56] References Cited

U.S. PATENT DOCUMENTS

| | | | |
|---|---|---|---|
| 4,222,263 | 9/1980 | Armstrong | 73/116 |
| 4,335,599 | 6/1982 | Kohler | 73/116 |
| 4,373,486 | 2/1983 | Nichols et al. | 123/414 |
| 4,406,272 | 9/1983 | Kiess et al. | 123/617 |
| 4,508,092 | 4/1985 | Kiess et al. | 123/617 |
| 4,513,609 | 4/1985 | Takenaka et al. | 73/116 |

OTHER PUBLICATIONS

"Delta Phi Geartooth Sensor, Technical Explanation", D. Lorenzen, 12/12/86.
"The Application of Permanent Magnets to Hall Effect Sensors", T. Spahr, Magnetic Material Producers Association Conference 1/29/86.
"Hall Effect Vand and Geartooth Sensors", R. Holmes and M. Podemski, Technical Exchange Seminar, 2/4–5/86.
"Abstract", M. Podemski.

Primary Examiner—Jerry W. Myracle
Attorney, Agent, or Firm—Kinney & Lange

[57] ABSTRACT

A dual output magnetic sensor employing a magnet having first and second poles and a pair of magnetic sensors one of which is located close to a first of the poles and the other of which is located a spaced distance from the second of the poles to form a gap and wherein first and second magnetic field shunting members are operable to move to positions away from and close to the sensors, one of the members passing adjacent to but outside of the first magnetic sensor and the second of the members passing through the gap.

20 Claims, 2 Drawing Sheets

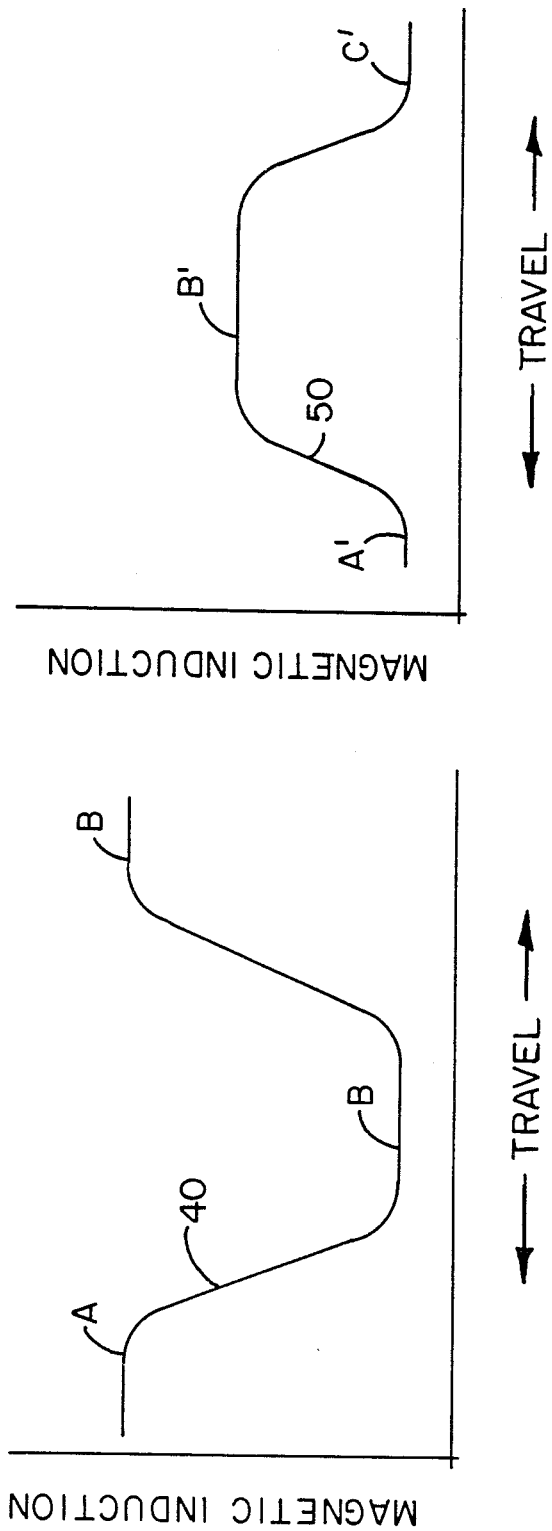

DUAL OUTPUT MAGNETIC SENSOR

BACKGROUND OF THE INVENTION

1. Field of the Invention

The present invention relates to magnetic sensors, and, more particularly, to a dual Hall effect sensor operable with a single magnet to produce two independent outputs each of which changes when an associated magnetic shunting material passes in proximity thereto.

2. Description of the Prior Art

Magnetic sensors which produce outputs when in the proximity of a magnetic field are well known in the art. One variety of such sensor is known as the Hall effect sensor which produces an electrical output indicative of the magnitude of the magnetic field in which it is located. Hall effect sensors have been used in the prior art to detect motion of a ferrous member or other field shunting material which passes close thereto and affects the distribution of the magnetic field of the magnet. One such use for such apparatus is found in automotive applications for distributorless ignition systems. For example, in the Armstrong U.S. Pat. No. 4,222,263 issued Sept. 16, 1980, a crankshaft positioned transducing system is shown having a pair of reference elements mounted circumferentially and at radially spaced locations on the fly wheel with a transducer head having two individual transducers which cooperate with a respective one of the reference elements to produce a trigger impulse. Similar systems are shown in the Kiess et al U.S. Pat. Nos. 4,406,272 and 4,508,092 issued Sept. 27, 1983 and Apr. 2, 1985, respectively. There is, however, a need for a magnetic sensor which can operate to produce two different signals each of which is indicative of the motion of a magnetic field shunting material as, for example again, in automotive applications where it is desired to not only provide distributorless ignition operation but also, for example, to provide other control functions such as the activation of a fuel injection system or an RPM indicator. In the Nichols et al U.S. Pat. No. 4,373,486, which issued Feb. 15, 1983, a dual output sensor is shown wherein a ferrous disk is rotatably driven by an internal combustion engine shaft and upon which there are inner and outer circumferential rims projecting outwardly from one side thereof. Each of the rims has arcuate notches therein and two magnetic sensors are positioned, one to the inside of the inner rim and one to the outside of the outer rim, with a permanent magnet positioned between the two rims. Accordingly, as the disk rotates, the rims move between the magnet and each of the sensors so that the notches cause a disturbance in the magnetic field between the permanent magnet and each of the magnetic sensors. The system thefore produces two outputs utilizing the same permanent magnet.

The difficulty with the Nichols et al system is that it requires that there be two magnetic field shunting material members each of which passes between the permanent magnet and one of the sensors. The motion of a member between the magnet and the sensor is referred to as a "vane" operated system, and it is difficult to provide two "vane" projections for use with the permanent magnet. Extra space in automotive applications is quite scarce and providing two vanes driven by the crankshaft takes up room. Finding space for the sensor is therefor impossible in some situations. Furthermore, the vanes have to be very accurately positioned to rotate between the magnet and the sensors.

Another type of sensor referred to as a "gear tooth" operated system, is known in the art. In a "gear tooth" system, a magnetic sensor is located closely adjacent to one end of a magnet and any available magnetic field shunting material, such as an already existing gear tooth in an automotive system, passes on the other side of the magnetic sensor and not between the sensor and the magnet. Such a "gear tooth" was described at a "technical exchange seminar" presented by Honeywell Microswitch Division on Feb. 4–5, 1986. The "gear tooth" operation is more convenient for use with a magnetic field sensor since already existing equipment can be used as the shunting material and the accuracy problems are alleviated since there is no requirement that a magnetic field shunting material pass between the sensor and the magnet. Accordingly, mounting locations adjacent the rotating parts of the internal combustion engine are more easily obtained than is the case with "vane" operation and with less accuracy difficulties. On the other hand, the output obtained from a "gear tooth" system is somewhat smaller than that obtained from a "vane" system, and the output from the "gear tooth" system may not be of sufficient magnitude for operation of a distributorless ignition system although it may be sufficient for operation of other portions of the automotive system such as the fuel injection system.

Accordingly, it has been desired to provide a magnetic sensing system which can produce two independent outputs yet has some of the advantages of the "gear tooth" system for ease in location, and some of the advantages of the "vane" operation to produce a sufficient output for driving the distributorless ignition system.

SUMMARY OF THE INVENTION

The present invention utilizes a single magnet one end of which has a magnetic sensor closely proximate thereto and positioned near the "gear tooth" type magnetic field shunting member and the other end of which has a magnetic sensor spaced with respect thereto to accommodate a "vane" type magnetic field shunting material. As such, the apparatus may be set up with the "vane" portion thereof operating to produce an output sufficient for driving the distributorless ignition system and the "gear tooth" portion producing an output sufficient to drive the fuel injection system or other low power requirement devices. This provides greater positioning flexibility than the double vane system yet provides the high output advantages also.

BRIEF DESCRIPTION OF THE DRAWINGS

FIG. 3 shows a graph of the output of the right-hand sensor of FIGS. 1 and 2;

FIG. 4 is a graph of the output of the left-hand sensor of FIGS. 1 and 2;

DETAILED DESCRIPTION OF THE PREFERRED EMBODIMENTS

Figure 1:
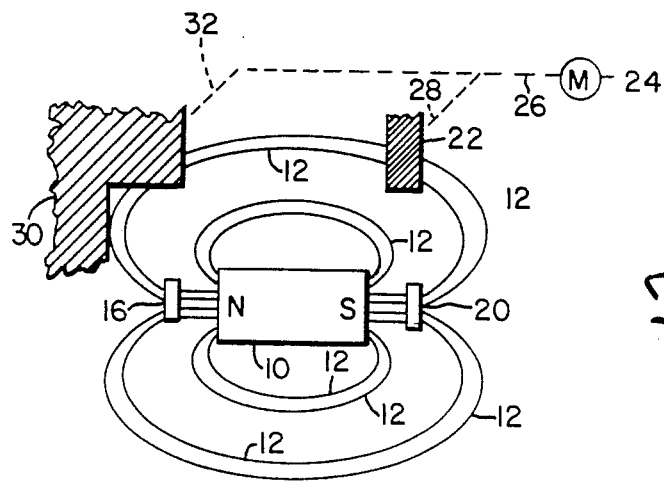
FIG. 1 shows a magnet having two magnetic sensors proximate the ends and a pair of magnetic field shunting members in a position displaced from the magnet.

In FIG. 1, a magnet 10 is shown having a north pole on its left end and a south pole on its right end, and with magnetic lines of force as shown by reference numeral 12. Positioned near the left end of magnet 10 is a magnetic sensor 16 which in the preferred embodiment is a Hall effect sensor and which is shown located relatively close to the north pole of magnet 10. Positioned at the right end of magnet 10, a second magnetic sensor 20 which also, in the preferred embodiment, is a Hall effect sensor, is shown spaced a small distance from the south pole of magnet 10. The distance is chosen so as to accommodate a first vane-like magnetic field shunting device 22 which is movable under the action of a motor 24 which drives member 22 by mechanical connection such as shown by dashed lines 26 and 28. When used with an automotive distributorless ignition system, motor 24 may be an automobile engine with dashed line 26 being the camshaft and dashed line 28 being an extension of the camshaft incorporating the member 22. Member 22 may be composed of a ferrous material which will operate to concentrate the lines of force 12 as it approaches magnet 10.

Also shown in FIG. 1 is a gear tooth-like member 30 which is also driven by motor 24 through mechanical connections shown as dashed lines 26 and 32. Gear tooth 30 may, in automotive applications, be any convenient projection on a rotatable part of the camshaft and which may also be of ferrous material so as to distort the lines of force 12 as it approaches the vicinity of magnet 10 under the action of motor 24. As seen in FIGS. 1, a few of the lines of force 12 pass through sensors 16 and 20, and both sensors may be producing electrical outputs.

Figure 2:
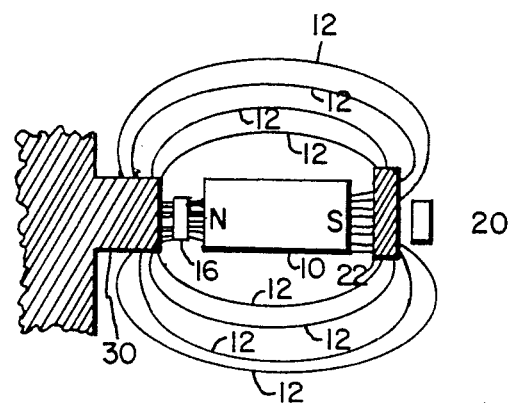
FIG. 2 shows the field shunting members of FIG. 1 in a position proximate the magnet.

FIG. 2 shows magnet 10 and sensors 16 and 20 in the same position as shown in FIG. 1, but in FIG. 2 vane-like member 22 has moved down to a position between sensor 20 and the south pole of magnet 10 while gear tooth-like member 30 has moved down to a position adjacent to but outside of sensor 16. It is seen that the magnetic lines of force emanating from the south pole of magnet 10 are now mostly shunted by vane 22 so that very few of them reach the magnetic sensor 20. Accordingly, the output of the magnetic sensor 20 will diminish when vane 22 is located in the position shown in FIG. 2.

Gear tooth 30, on the other hand, now distorts the magnetic lines of force 12 so that a greater number of lines pass through sensor 16 than was the case in connection with FIG. 1. Accordingly, the output of magnetic sensor 16 will increase when the gear tooth 30 is in the position shown in FIG. 2. The motor 24 and driving shafts 26, 28 and 32 are not shown in FIG. 2 for simplicity.

FIG. 3 is a graph plotting the travel of vane-like magnetic field shunting member 22 against the magnetic induction sensed by sensor 20. It is seen that a curve 40 is generated which moves from a relatively high value at point A to a relatively low value at point B and back to a relatively high value at point C to show how the induction changes as the vane 22 passes through the gap between the south pole of magnet 10 and sensor 20.

FIG. 4 is a graph plotting the travel of gear tooth-line magnetic field shunting member 30 against the magnetic induction sensed by sensor 16. In FIG. 4, the curve 50 is seen to increase from a relatively low value A' to a relatively high value B' and back again to a relative low value C' to show how the induction changes as the gear tooth 30 passes the north pole of magnet 10 and sensor 16. The induction values in FIGS. 3 and 4 are intended to be relative values and not absolute values drawn to the same scale. Nevertheless, it should be noted that the relative magnitude of the signal at point A in FIG. 3 with respect to point B represents a greater change of level than the change of level represented by the magnitude of the signal at point A' in FIG. 4 with respect to point B'. This is accounted for by the fact that the gear tooth type sensor 16 produces less change in output than the vane type sensor 20. Accordingly, the output of the vane type sensor 20 can be used to drive the distributorless ignition system of the automobile whereas the output of the gear tooth sensor 16 may be used for other purposes such as the fuel injection system or RPM indicator for the automobile.

Of course, other uses for the two outputs will be seen by those skilled in the art and the present invention is not intended to be limited only to use in automotive systems. It should also be noted that in FIGS. 1 and 2 the vane 22 and gear tooth 30 move together so that they occupy the position close to magnet 10 in FIG. 2 at the same time. Clearly, the members 22 and 30 may be spaced apart and approach magnet 10 at different times and still obtain the pulse-like outputs useful in control systems. It is not even necessary that vane 22 and gear tooth 20 be commonly driven by motor 24 since each could be independently driven and still obtain useful outputs from the present invention.

Figure 5:
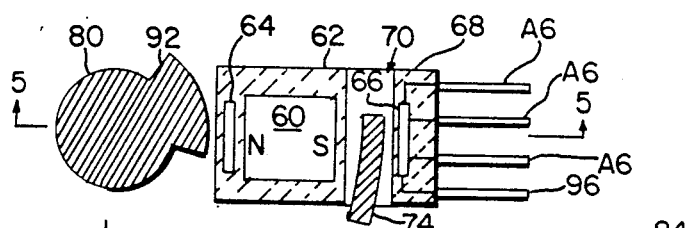
FIG. 5 is a cross-sectional showing of the present invention employed with respect to a rotating shaft and vane.
Figure 6:
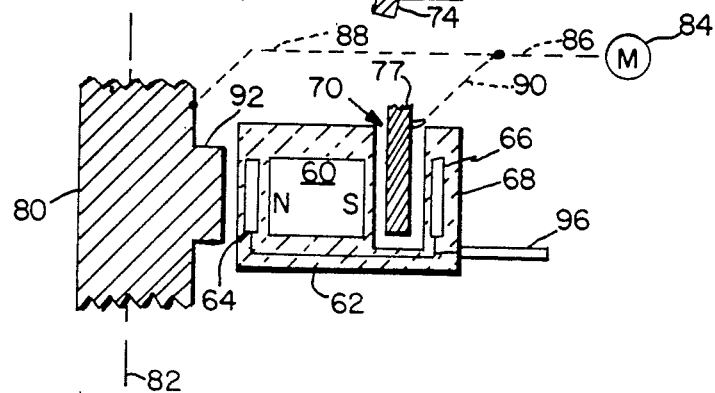
FIG. 6 is a cross-sectional side view of FIG. 5 taken along lines 5—5.

FIGS. 5 and 6 show a system similar to that shown in FIG. 1 but in which a magnet 60, having a north pole on its left end and a south pole on its right end, is shown embedded in a block 62 of plastic or other non-magnetic material. A first magnetic sensor 64, also embedded in the plastic 62, is shown located proximate the north end of magnet 60 while a second magnetic sensor 66 is shown imbedded in an attached arm 68 of member 62 so as to provide a gap 70 between the left and right portions of plastic housing 62. Sensors 64 and 66 may also be Hall effect sensors. The gap 70 is wide enough to accommodate a vane member 74 made of a ferrous or other magnetic field shunting material. A shaft 80, shown on the left side of FIGS. 5 and 6, is rotatable about an axis 82 by a motor 84 and mechanical connections shown as dashed lines 86 and 88. Vane 74 may also be driven by motor 84 though shafts shown as dashed line 86 and a dashed line 90. Motor 84 and shafts 86, 88 and 90 may, like in FIG. 1, be portions of an internal combustion engine, such as the crankshaft and extensions thereof, and are shown in FIG. 6 but not in FIG. 5 for simplicity.

A gear tooth 92 is shown extending from shaft 80 and passing near the sensor 64. As was the case in FIGS. 1 and 2, the gear tooth 92 and vane 74 of FIGS. 5 and 6 operate to distort the magnetic field which is sensed by sensors 64 and 66 so as to change their outputs in a manner such as shown in FIGS. 3 and 4. The outputs of magnetic sensors 64 and 66 are obtainable from the system through a plurality of output leads 94 from the sensors to a plurality of connectors 96 to provide the desired signals for use in driving the automotive systems or other apparatus.

Housing 62 can be placed at any convenient location near any rotating extension or part, such as gear tooth 92, and only vane 74 need be accurately positioned to pass through gap 70. Thus, mounting difficulties are therefore diminished while retaining the benefits of prior art systems.

It is thus seen that I have provided a dual output magnetic sensor capable of producing one relatively large output signal by use of a "vane" type system and a second, somewhat lesser magnitude output signal by use of a "gear tooth" type system, both operated using only a single magnet.

Although the present invention has been described with reference to preferred embodiments, workers skilled in the art will recognize that changes may be made in form and detail without departing from the spirit and scope of the invention.

What is claimed is:

1. Dual magnetic sensing apparatus comprising:
   a magnet having first and second poles;
   a first magnetic sensor mounted proximate the first pole a first distance therefrom;
   a second magnetic sensor mounted proximate the second pole a second distance therefrom;
   a first magnetic field shunting member mounted for motion past the first pole at a distance greater than the first distance to increase the field strength sensed by the first sensor; and
   a second magnetic field shunting member mounted for motion past the second pole at a distance less than the second distance to decrease the field strength sensed by the second sensor.

2. Apparatus according to claim 1 wherein the first and second sensors are Hall effect sensors.

3. Apparatus according to claim 1 further including motive means for driving the first and second field shunting members.

4. Apparatus according to claim 1 wherein the first and second field shunting members are rotatable about a common axis.

5. Apparatus according to claim 4 wherein the first and second sensors are Hall effect sensors.

6. Apparatus according to claim 4 further including motive means for driving the first and second field shunting members.

7. Apparatus according to claim 1 wherein the first field shunting member is a gear tooth and the second field shunting member is a vane.

8. Apparatus according to claim 7 wherein the first and second sensors are Hall effect sensors.

9. Apparatus according to claim 8 further including motive means for driving the first and second field shunting members.

10. Apparatus according to claim 9 wherein the motive means includes an engine crankshaft.

11. The method of producing a pair of pulsed outputs from a single magnet having first and second poles comprising the steps of:

A. mounting a first magnetic sensor a first distance from the first pole;
   B. mounting a second magnetic sensor a second distance from the second pole;
   C. moving a first magnetic field shunting member past the first pole at a distance greater than the first distance to increase the magnetic field sensed by the first sensor; and
   D. moving a second magnetic field shunting member past the first pole at a distance less than the second distance to decrease the magnetic field sensed by the second sensor.

12. The method of claim 11 wherein the first and second magnetic sensors are Hall effect sensors.

13. The method of claim 11 wherein the first and second magnetic field shunting members are connected together for motion by a single mover.

14. The method of claim 13 wherein the first and second magnetic sensors are Hall effect sensors.

15. The method of claim 14 wherein the single mover is an engine crankshaft.

16. Dual magnetic sensing apparatus comprising:
    housing means comprised of non-magnetic material, the housing means formed to provide first and second body portions with a gap therebetween;
    a permanent magnet mounted within the first body portion of the housing means with a first pole proximate the gap and a second pole remote from the gap;
    first magnetic sensing means mounted within the first body portion proximate the second pole;
    second magnetic sensing means mounted within the second body portion; and
    conductive means connected to the first and second sensing means and extending out of the housing means.

17. Apparatus according to claim 16 wherein the first and second sensing means are Hall effect sensors.

18. Apparatus according to claim 16 further including first magnetic field shunting means movable exteriorly of the housing means and proximate the first magnetic sensing means to increase the magnetic field sensed by the first sensing means, and second magnetic field shunting means movable through the the gap to decrease the magnetic field sensed by the second sensing means.

19. Apparatus according to claim 18 wherein the first and second sensing means are Hall effect sensors.

20. Apparatus according to claim 19 wherein the conductive means conducts electrical signals from the first and second sensing means indicative of the increase and decrease of the magnetic fields sensed by the first and second sensing means, respectively.

* * * * *